United States Patent
Prakash et al.

(10) Patent No.: US 9,932,257 B2
(45) Date of Patent: Apr. 3, 2018

(54) SYSTEMS AND METHODS FOR PRODUCING REGENERANT BRINE AND DESALINATED WATER FROM HIGH TEMPERATURE PRODUCED WATER

(71) Applicant: Chevron U.S.A. Inc., San Ramon, CA (US)

(72) Inventors: Prakhar Prakash, Bakersfield, CA (US); Gini Chauhan, Paso Robles, CA (US); Evan Shigeto Hatakeyama, Richmond, CA (US)

(73) Assignee: CHEVRON U.S.A. INC., San Ramon, CA (US)

( * ) Notice: Subject to any disclaimer, the term of this patent is extended or adjusted under 35 U.S.C. 154(b) by 35 days.

(21) Appl. No.: 15/223,938

(22) Filed: Jul. 29, 2016

(65) Prior Publication Data

US 2018/0029910 A1    Feb. 1, 2018

(51) Int. Cl.
| | |
|---|---|
| C02F 1/44 | (2006.01) |
| C02F 1/42 | (2006.01) |
| C02F 1/20 | (2006.01) |
| C02F 1/465 | (2006.01) |
| B01D 61/36 | (2006.01) |

(Continued)

(52) U.S. Cl.
CPC ............... *C02F 9/00* (2013.01); *B01D 61/025* (2013.01); *B01D 61/145* (2013.01); *B01D 61/364* (2013.01); *B01D 61/58* (2013.01); *C02F 1/20* (2013.01); *C02F 1/42* (2013.01); *C02F 1/441* (2013.01); *C02F 1/444* (2013.01); *C02F 1/447* (2013.01); *C02F 1/463* (2013.01);

(Continued)

(58) Field of Classification Search
None
See application file for complete search history.

(56) References Cited

U.S. PATENT DOCUMENTS

| | | |
|---|---|---|
| 7,731,854 B1 | 6/2010 | Herbst |
| 9,138,688 B2 | 9/2015 | Prakash et al. |

(Continued)

FOREIGN PATENT DOCUMENTS

WO    WO-2012116409 A1 *    9/2012    ........... B01D 61/368

*Primary Examiner* — Krishnan S Menon
(74) *Attorney, Agent, or Firm* — Karen R. DiDomenicis

(57) ABSTRACT

A process treats high temperature produced water by passing a stream to an electrocoagulation unit and then to a membrane distillation (MD) unit where the stream contacts a hydrophobic membrane on a feed side and deionized water contacts the membrane on a product side. A distilled water stream is recovered and collected with the product side stream to form a volume-depleted exit produced water stream on the feed side of the hydrophobic membrane. The exit product side stream is passed through a heat exchanger to form a stream that is returned to a location upstream of the MD unit for an additional pass through the MD unit, thereby recovering additional water. The stream can be returned multiple times to achieve high recovery and to form a final stream leaving the MD unit having a temperature from 40-60° C., a total oil and grease content no greater than 500 mg/L, and a suspended solids content no greater than 200 mg/L. A portion of the distilled water stream from the membrane distillation unit can be used to form a brine solution used to regenerate used ion exchange resin in a water softening system.

14 Claims, 2 Drawing Sheets

(51) Int. Cl.
  *C02F 1/463* (2006.01)
  *B01D 61/58* (2006.01)
  *B01D 61/14* (2006.01)
  *B01D 61/02* (2006.01)
  *C02F 9/00* (2006.01)
  *C02F 103/10* (2006.01)

(52) U.S. Cl.
  CPC ........ *C02F 1/465* (2013.01); *C02F 2001/425* (2013.01); *C02F 2103/10* (2013.01); *C02F 2303/16* (2013.01)

(56) References Cited

U.S. PATENT DOCUMENTS

| | | |
|---|---|---|
| 9,180,411 B2 | 11/2015 | Prakash et al. |
| 2003/0141250 A1 | 7/2003 | Kihara et al. |
| 2009/0032446 A1 | 2/2009 | Wiemers et al. |
| 2010/0224476 A1* | 9/2010 | Cath ............... B01L 31/221 203/10 |
| 2010/0319535 A1 | 12/2010 | Joshi et al. |
| 2011/0031100 A1 | 2/2011 | Qtaishat et al. |
| 2012/0255904 A1 | 10/2012 | Nagghappan |
| 2013/0075334 A1 | 3/2013 | Prakash et al. |
| 2013/0075335 A1* | 3/2013 | Prakash ............ C02F 1/463 210/640 |
| 2014/0202957 A1 | 7/2014 | Tao |
| 2015/0083663 A1* | 3/2015 | Komor ............. C02F 1/442 210/639 |
| 2015/0315055 A1* | 11/2015 | Chidambaran ..... C02F 9/00 166/266 |
| 2015/0360988 A1 | 12/2015 | Tao et al. |
| 2015/0376033 A1 | 12/2015 | Tao et al. |
| 2017/0028348 A1* | 2/2017 | Hancock ........... B01D 61/002 |

* cited by examiner

SYSTEMS AND METHODS FOR PRODUCING REGENERANT BRINE AND DESALINATED WATER FROM HIGH TEMPERATURE PRODUCED WATER

FIELD

The present disclosure relates to systems and methods for producing regenerant brine to regenerate used ion exchange resin in a water softening system utilizing sensible heat of produced water obtained in oil and gas production. The present disclosure further relates to systems and methods utilizing sensible heat of produced water in the production of desalinated water.

BACKGROUND

For every barrel of crude oil produced, about three to ten barrels of water is produced. In the oil and energy industry, water that is drawn from a formation is referred to as "produced water." Produced water may be used interchangeably with "production water," to refer to water separated from the production of stream and gas wells, including but not limited to tar sand wastewater, oil shale wastewater, water from steam assisted gravity drainage oil recovery process, and flowback water. Produced water is generated during oil production as a waste stream. In many instances, this waste stream can be seven or eight times greater than oil produced at any given oil field. Some of this water can be re-injected to the well for pressure maintenance, some is injected to deep well for final disposal in the case of proper aquifer conditions, and some is reclaimed for use as oilfield steam generator feed water. Large amount of water is typically needed for steam generation. Large amount of energy is needed to create steam from water. The produced water, which is not reinjected to the production well such as reclaimed water for steam generation, has to be treated. Produced water has distinctive characteristics due to organic and inorganic matters, potentially causing fouling and limiting steam generator reliability, and ultimately oil production.

The injection of steam for heavy oil recovery has become an important enhanced oil recovery (EOR) method. In EOR, high pressure steam is injected at a rate sufficient to heat the formation to reduce the oil viscosity and provide pressure to drive the oil toward the producing wells. For EOR, steam is normally produced in steam generators, with full steam makeup of water required to feed the generator. The feed water should be substantially free of iron and hardness, e.g., calcium and magnesium to prevent scale formation in the steam generator tubes or in the oil formation, causing plugging of downhole injection lines, causing increased pressure drop and increasing the power demand on pumps. Silica at high concentration can also pose a precipitation problem with scaling in steam generators and associated pipelines. Steam-generation quality water is water having less than 10 mg/L total organic carbon (TOC), less than 50 ppm silica and less than 1 ppm hardness as calcium carbonate. Since fresh water is not always available for EOR, the treatment of produced water in the oil recovery process becomes necessary.

In current practice, brine is formulated with de-oiled produced water which has significant hardness and residual oil impurities. This leads to inefficient regeneration of ion exchangers which results in hardness leakage during service cycle. Reverse osmosis (RO) is an option to provide water for making regenerant brine; however current reverse osmosis membranes are not able to operate at temperatures above 40-45° C. Therefore the sensible heat of produced water at very high temperatures cannot be utilized using current RO technology.

There exists a need for systems and methods which better utilize sensible heat of produced water obtained in oil and gas production to improve energy efficiency of water treatment operations.

SUMMARY

In one aspect, a process is provided for treating high temperature produced water derived from hydrocarbon production operations. The process includes passing a produced water feed stream at a feed temperature from 70° C. to 95° C. and having a total dissolved solids concentration less than 15,000 mg/L and a hydrogen sulfide content of up to 1000 ppm to an electrocoagulation or an electroflotation unit. The stream is then passed to a first direct contact membrane distillation unit where the produced water feed stream contacts a hydrophobic membrane on a membrane feed side, and an inlet product side stream including deionized water contacts the hydrophobic membrane on a membrane product side at a temperature of from 15° C. to 35° C. A first distilled water stream is recovered from the produced water feed stream and collected with the inlet product side stream on the membrane product side to form an exit product side stream. A volume-depleted exit produced water stream is formed on the membrane feed side of the hydrophobic membrane. The exit product side stream is passed through a heat recovery heat exchanger where the exit product side stream transfers heat to the volume-depleted exit produced water stream to form a return inlet produced water stream. The return inlet produced water stream is returned from the heat recovery heat exchanger to a location upstream of the first direct contact membrane distillation unit for an additional pass through the first direct contact membrane distillation unit, thereby recovering additional water from the membrane feed side to the membrane product side. The return inlet produced water stream can be returned multiple times as needed to achieve a recovery of from 15 to 45 vol % of the produced water feed stream and to form a final exit produced water stream leaving the first direct contact membrane distillation unit having a temperature of from 40 to 60° C., a total oil and grease content no greater than 500 mg/L, and a suspended solids content no greater than 200 mg/L. A first portion of the first distilled water stream from the first direct contact membrane distillation unit is passed to a brine tank at a temperature of from 55 to 80° C. where the first portion of the first distilled water stream is combined with sodium chloride to form a concentrated brine solution comprising from 8 wt % to 18 wt % brine. Finally, the concentrated brine solution is utilized to regenerate used ion exchange resin in a water softening system wherein monovalent sodium ions in the brine solution displace multivalent hardness causing ions such as calcium, magnesium, and iron on the ion exchange resin.

In another aspect, the process further includes passing the final exit produced water stream from the first direct contact membrane distillation unit to a filtration unit utilizing an ultrafiltration membrane, a polymeric membrane or a ceramic membrane to form a clarified stream substantially free of suspended solids, oil and grease. The clarified stream is then passed from the filtration unit to an ion exchange unit wherein the clarified stream contacts a strong acid cation resin to form a soft water stream having a hardness of less than 10 ppm as calcium carbonate. The soft water stream is then passed through a reverse osmosis membrane to form a product stream and a reject stream.

In yet another aspect, a system is provided for treating high temperature produced water to carry out the above processes. The system includes at least the following system components:

an electrocoagulation/electroflotation unit having an inlet for receiving a produced water feed stream and an outlet;

a first direct contact membrane distillation unit in fluid communication with the outlet of the electrocoagulation/electroflotation unit comprising a hydrophobic membrane having a membrane feed side for receiving the produced water feed stream from the electrocoagulation/electroflotation unit and a membrane product side for receiving a deionized water stream;

a heat recovery heat exchanger in fluid communication with the first direct contact membrane distillation unit for receiving two streams, one from each side of the hydrophobic membrane, such that heat is exchanged between the two streams;

a line leaving the heat recovery heat exchanger for returning a heated stream from the heat recovery heat exchanger to a location in a line upstream of the first direct contact membrane distillation unit; and a brine tank in fluid communication with the first direct contact membrane distillation unit for receiving a portion of a stream from the membrane product side and for containing a concentrated brine solution comprising the portion of the stream from the membrane product side and sodium chloride.

DESCRIPTION OF THE DRAWINGS

These and other objects, features and advantages of the present invention will become better understood with reference to the following description, appended claims and accompanying drawings where:

DETAILED DESCRIPTION

Figure 1:
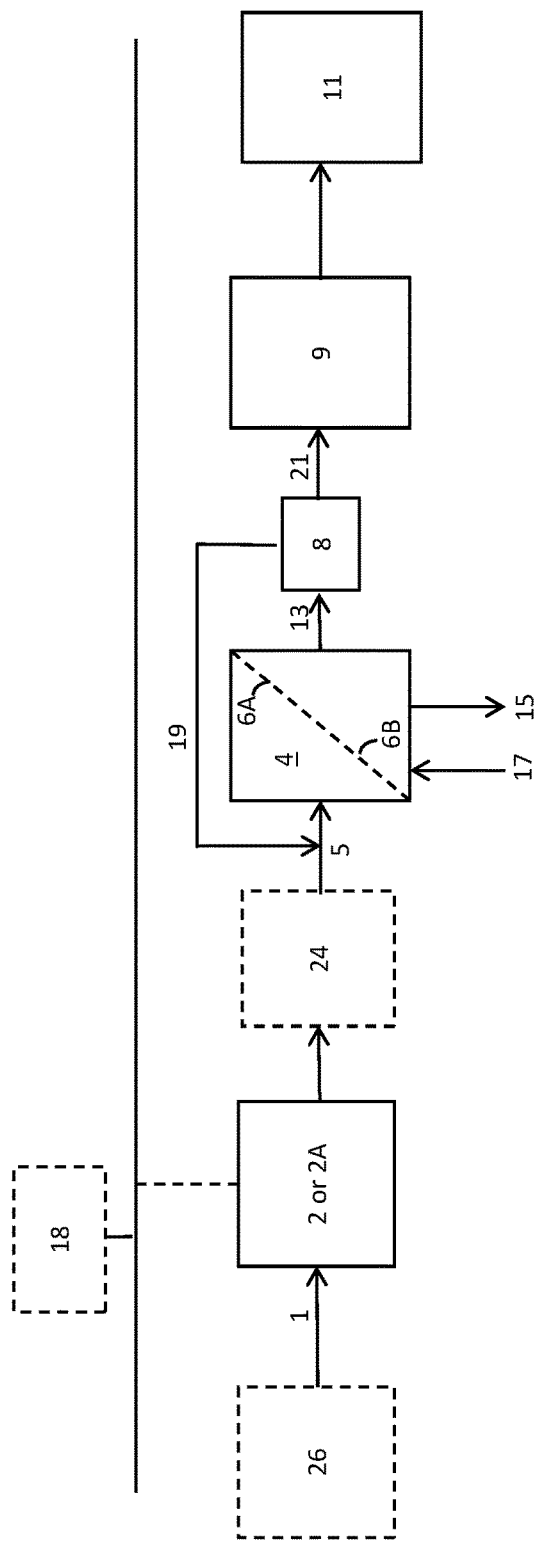
FIG. 1 is a schematic process flow diagram illustrating a process according to one exemplary embodiment.

Referring to FIG. 1, one embodiment of a system for treating high temperature produced water will now be described.

In one embodiment, an electrocoagulation (EC) unit 2 having an inlet for receiving a feed stream and an outlet is provided. The EC unit 2 is used to remove total suspended solids (TSS), oil and grease, turbidity, microbes, silica, and hardness from the produced water. The EC unit 2 applies electrical current to treat and flocculate contaminants without having to add coagulations. EC consists of pairs of metal sheets referred to as electrodes, arranged in pairs of anodes and cathodes. At least one of the cathode and anode is sacrificial and made from materials such as iron, aluminum, zinc, or magnesium, with the ions thereof migrating into the electrolyte and bonding with impurities to create precipitates. In the EC unit 2, possible reactions that may occur on the anode surface are metal dissolution and oxygen evolution. The half-cell reactions may be any of anodic and cathodic reactions. In an example with iron being employed for the electrode, the possible anodic reactions are metal dissolution, oxygen evolution, and oxidation of metal ion to higher oxidation state, as shown below:

$$Fe = Fe^{2+} + 2e-$$

$$4Fe^{2+} + O_2 + 4H^+ = 4Fe_3^+ + 2H_2O$$

$$4Fe^{2+} + O_2 + 4H^+ = 4Fe_3^+ + 2H_2O$$

The primary cathodic reactions that may occur on the cathode surface are oxygen reduction and hydrogen evolution, which may be expressed as shown below:

$$2H^+ + 2e^- = H_2$$

Ferric ions precipitate as ferric hydroxide. These ions function to capture constituents in the produced water within the ferric hydroxide complexes, generating precipitates, as shown below.

$$Fe^{3+} + 3OH^- = Fe(OH)_3$$

As it passes through the EC cell, the coagulants introduced by the passage of electric currents through iron or aluminum electrodes in the EC chamber help reduce the concentration of hardness and silica to a low value with the formation of precipitates. The EC process is tunable, meaning that variations may be introduced to adapt to slightly changed conditions. In one embodiment by changing the amperage in the process, it is possible to vary the amount of hardness and silica removed.

Depending on the composition of the produced water to be treated, additives may be used if needed during the electrocoagulation. For example, when non-sacrificial cathodes and anodes are used, the additives may be used to form ions to interact with solutes and particulate matter in coagulating the impurities out of suspension and solution. When sacrificial cathodes and anodes are used, additives may be used to increase the conductivity of the water stream to enhance electrocoagulation processes. The additives may be later removed, or involved in the chemical processes to form precipitates. In addition, to improve flocculation, flocculants can also be added to the electrocoagulation.

Additionally, depending on the composition of the produced water, the pH of the feed water to the EC unit can be optionally adjusted to a pre-select pH to optimize its operation to maximize the removal of both the hardness and the silica level. The removal of hardness materials such as calcium carbonate helps reduce scaling of further treatment units downstream, e.g., filtration membranes. With the use of sacrificial electrodes, some caustic in the form of sodium hydroxide or sodium carbonate can be added to the produced water feed to adjust the pH. By changing the pH conditions of the produced water to a pre-select basic pH, at least 90% of the hardness can be removed, even at least 95%, even at least 99%. This pre-select pH can be at least 9 in one embodiment; even at least 9.5, even at least 10, and even at least 10.5 for the removal of at least 90% of the hardness and silica. In another embodiment, the pre-select pH is maintained in the range of 7.2 to 11.5. The total hardness of the EC treated water can be less than 5 ppm; and even less than 1 ppm.

The EC unit 2 results in desirable end result of high quality treated water for steam generation and an incremental increase in water temperature.

In one embodiment, an electroflotation (EF) unit 2A having an inlet for receiving the feed stream and an outlet can be used in place of the EC unit 2. The EF unit 2A operates similarly to the EC unit 2, but no iron coagulant is added in the EF process. In the electroflotation process, electric current is passed through a solution to generate tiny hydrogen bubbles by the hydrolysis of water. The bubbles then act to collect pollutants and carried them to the surface of the water. In this way, TSS including oil, grease, sludge, solids and the like can be removed, either using EC unit 2 or EF unit 2A.

In one embodiment, the produced water feed stream 1 enters the system at a feed temperature from 70° C. to 95° C. As the high temperature is maintained in the EC or EF step, then a limited amount of heat may be needed to boil the water to create steam. Some of the electrical energy from the EC or EF process is wasted in the form of heat that increases the temperature of the water by e.g. 2-10° C. This additional heat is advantageous to improve the MD step, to be described below. This additional heat aids the thermal driving force in downstream steps.

In one embodiment, a clarifying unit 24 can be coupled to the outlet of the electrocoagulation unit 2 or the electroflotation unit 2A to aid the effectiveness of the electrocoagulation unit 2 or the electroflotation unit 2A. The clarifying unit 24 can be selected from an induced gas flotation (IGF) unit, a dissolved air flotation (DAF) unit or a clarifier or a settling tank. In an IGF unit, suspended matter is removed from water using gas bubbles typically containing natural gas or nitrogen injected into the water. The bubbles collect the suspended matter and bring it to the surface of the water where it may be removed by a skimmer. In a DAF unit, nitrogen gas is dissolved in the water under pressure and then released at atmospheric pressure. The released gas forms bubbles which collect the suspended matter and bring it to the surface of the water where it may be removed by a skimmer. The gases evolved in the EC or EF process help reduce the density of flocs, thereby making the skimming more efficient.

In one embodiment, the electrocoagulation unit 2 or the electroflotation unit 2A includes a head space. The head space can be connected to a vacuum pump 18 for drawing vacuum, e.g. of from 5 to 50 psi to remove at least a portion of the gases such as hydrogen sulfide and oxygen in the water stream. The use of vacuum advantageously results in an oxygen-free water product stream that can be used in downstream steps without oxygen scavengers.

A first direct contact membrane distillation (MD) unit 4 (also referred to as the low recovery MD unit 4) is placed in fluid communication with the outlet of the electrocoagulation unit 2 or the electroflotation unit 2A. The first direct contact membrane distillation unit 4 includes a hydrophobic membrane 6 having a membrane feed side 6A for receiving a stream from the electrocoagulation unit 2 and a membrane product side 6B for receiving a deionized water stream. The MD unit 4 can remove at least 95%, even over 98% of residual hardness and silica in the water in one embodiment, thus forming a steam-generation quality or boiler quality water.

The MD process is a thermally driven transport of vapor, typically through a non-wetted porous hydrophobic membrane, suitable for applications in which water is the major component present in the feed solution. The MD unit 4 is used to remove the total dissolved solids (TDS) and salinity in the water. Both the warm vaporizing feed stream and the cold condensate stream (treated produced water feed) are in direct contact with the membrane distillation apparatus. The driving force for membrane distillation is the partial pressure differential between the two sides of the membrane. Both the feed and permeate aqueous solutions may be circulated tangentially to the membrane surfaces by means of circulating pumps. Alternatively, the solution may be stirred inside the membrane cell by means of a magnetic stirrer. The trans-membrane temperature difference induces a vapor pressure differential. Volatile molecules evaporate at the hot liquid-vapor interface, cross the membrane pores in vapor phase, and condense in the cold liquid-vapor interface inside the membrane module. The liquid feed water to be treated by MD is maintained in direct contact with one side of the membrane without penetrating the membrane pores unless a trans-membrane pressure higher than the membrane liquid entry pressure is applied. The hydrophobic nature of the membrane usually prevents liquid solutions from entering membrane pores due to surface tension forces. Liquid-vapor interfaces are formed at the entrances of the membrane pores.

In one nonlimiting embodiment, the MD unit 4 employs a membrane of the type as disclosed in U.S. Pat. No. 8,167,143 and PCT patent publication WO 2012/097279, the disclosures of which are incorporated herein by reference. The membrane system can employ hydrophobic hollow fiber membranes in a shell casing, with the fiber containing any of regenerated cellulose (RC), cellulose acetate, and cellulose triacetate (CTA). In one embodiment the membrane module is configured to permit cross flow of the water to be treated relative to the hollow fibers. The hollow fiber module includes a central feed distributor tube, hollow fiber membranes positioned around the central feed distributor tube, end caps with ports for the flow of sweep air, and optionally a shell casing. The central feed distributor tube includes small holes to allow the removed oil to flow out radially on the shell side. Sweep air may be introduced into the bore of the hollow fibers in the tube side to remove permeated water vapor. Each membrane unit includes from about 5,000 to 200,000 hollow fiber membranes in one embodiment; from 10,000 to 100,000 fiber membranes in another embodiment. The membrane fibers have a length of 1 to 200 inches in one embodiment; from 5 to 100 inches in another embodiment. The membranes have a wall thickness ranging from 2 to 100 µm in one embodiment; from 5 to 75 µm in another embodiment; and from 10 to 50 µm in yet another embodiment. The membranes have a surface area of about 100 cm$^2$ to about 2.0 m$^2$. In one nonlimiting embodiment, the MD unit 4 employs membranes of the type as disclosed in US Patent Publication No. US20110031100A1, the disclosure of which is incorporated herein by reference. The membrane is of a composite hydrophilic/hydrophobic type having a high vapor flux, containing a hydrophilic polymer layer and a hydrophobic polymer layer. In one embodiment, the membrane has a vapor flux of at least about 50 kg/m$^2$-hr. The hydrophilic polymer layer can contain any of polysulfone, polyether sulfone, polyetherimide polyvinylidenefluoride, cellulose acetate, or combinations thereof. The hydrophobic polymer layer can contain a fluorinated surface-modifying macromolecule (SMM), e.g. poly(urethane propylene glycol) or poly(urea dimethylsiloxane urethane).

A cross flow heat exchanger 8, also referred to as a heat recovery heat exchanger 8, is placed in fluid communication with the first direct contact membrane distillation unit 4 for receiving two streams, one from each side of the hydrophobic membrane 6, such that heat is exchanged between the two streams. A line 7 connects an outlet of the heat recovery heat exchanger 8 to a location in a line 5 upstream of the first direct contact membrane distillation unit 4 for recycling a stream through the heat recovery heat exchanger 8.

A brine tank 9 is placed in fluid communication with the first direct contact membrane distillation unit 4 for receiving a portion of a product stream 13 from the membrane product side 6B and for containing a concentrated brine solution. In one embodiment, the disclosed system further includes a water softening system 11 which utilizes ion exchange resin capable of being regenerated by the concentrated brine solution.

Figure 2:
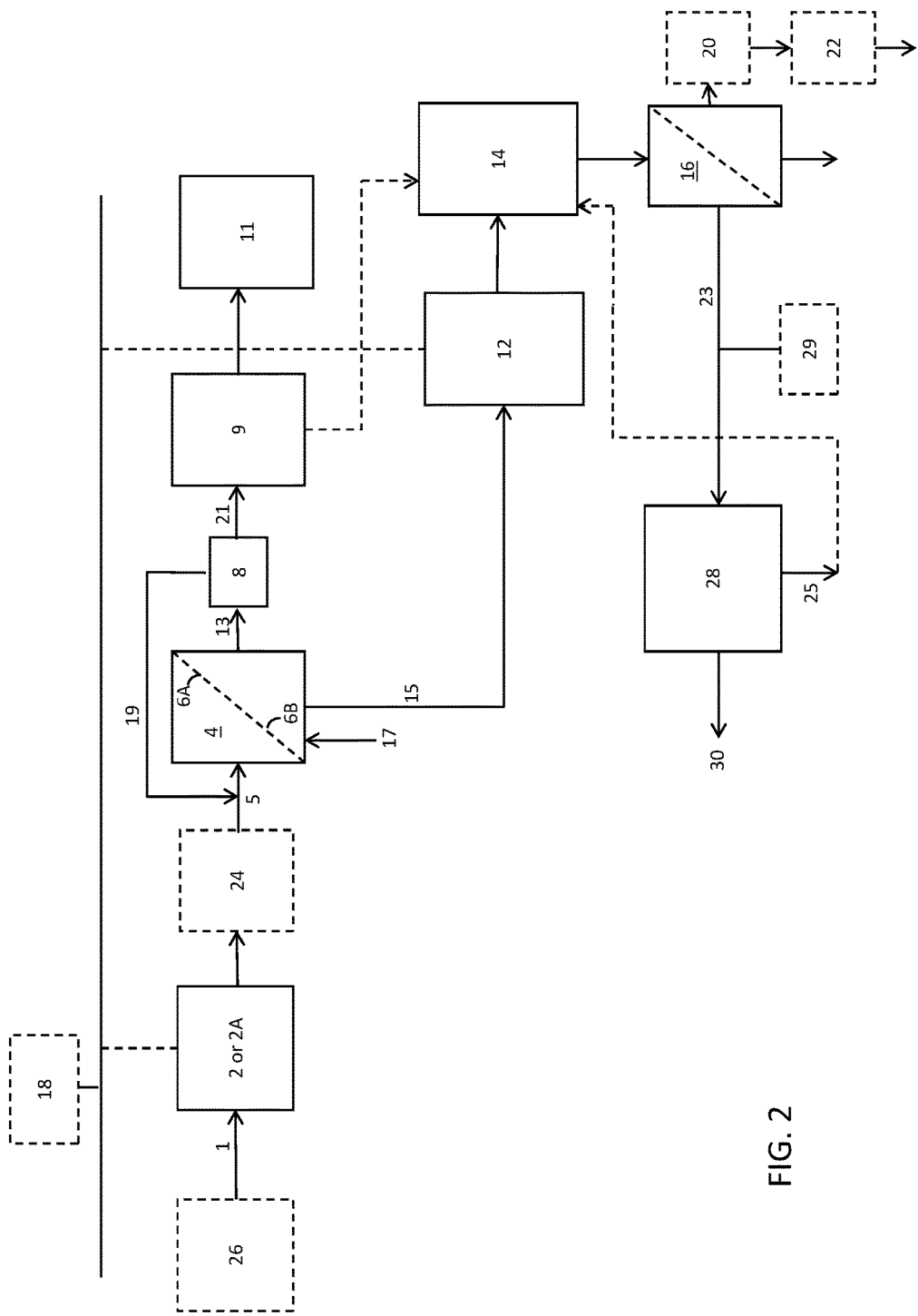
FIG. 2 is a schematic process flow diagram illustrating a process according to another exemplary embodiment.

In one embodiment, as shown in FIG. 2, the disclosed system further includes a filtration unit 12 which contains and utilizes an ultrafiltration (UF) membrane, a high temperature ultrafiltration membrane, a polymeric membrane or a ceramic membrane to form a clarified stream substantially free of suspended solids, oil and grease. The filtration unit 12 can be connected to vacuum pump 18 for drawing vacuum, e.g. of from 5 to 50 psi to remove at least a portion of the gases such as hydrogen sulfide present in the water stream. In one embodiment, the UF membrane 12, having a feed side and a permeate side, has the permeate side connected to vacuum pump 18 so that a vacuum level of from 5 to 50 psi removes gases, thereby resulting in an oxygen-free water product stream.

An ion exchange unit 14 which can contain and utilize strong acid cation (SAC) resin can be in fluid communication with the filtration unit 12. The ion exchange (IE) unit 14 can further be connected to the brine tank 9. In one embodiment, the strong acid cation resin can be a shallow shell ion exchange resin having a surface functional group. In another embodiment, the ion exchange unit 14 contains a functionalized microfiltration membrane having ion exchanging functional groups, e.g., surface functional groups. In one embodiment, the functionalized microfiltration membrane can be a porous microfiltration membrane (i.e., having pores therein). The microfiltration membrane can contain polyvinylidene difluoride (PVDF) fluoropolymer. The microfiltration membrane can contain surface functional groups formed via in situ polymerization of sodium acrylate. The ion-exchange unit 14 is employed to capture hardness in the produced water. In the IE unit 14, hardness ions are "exchanged" and bound onto the resin, thus effectively removing at least 95%, even at least 98%, and even at least 99% of hardness. In one embodiment, concentrated brine solution from brine tank 9 is fed to the ion exchange unit 14 to regenerate the resin and/or functional groups in the ion exchange unit 14.

In one embodiment, a reverse osmosis (RO) membrane 16 is in fluid communication with the ion exchange unit 14. Osmosis is the molecular diffusion of solvent across a semi-permeable or selectively permeable membrane, which rejects the solute. Osmosis is driven by a chemical potential gradient. This gradient is caused by differences in component concentration, pressure and/or temperature across the membrane. The driving force in osmosis is defined as the osmotic pressure of the concentrated solution. The membrane permeable species (solvent) diffuses from the region of higher activity to a region of lower activity. The osmotic pressure is the pressure that must be applied to a concentrated solution to prevent the migration of solvent from a dilute solution across a semi-permeable membrane. Reverse osmosis (RO) uses a higher pressure (e.g., 300 to 850 psi or 21 to 59 bar, or greater than 1000 psi) to overcome the osmotic pressure. It is used to reverse the flow of the solvent (water) from a concentrated solution to obtain higher desalinated water. For RO, water diffuses to the less saline side due to hydraulic pressure. In RO processes, almost all particles and ionic species and substances with molecular weight over 50 Dalton are retained, while water and some organic molecules are allowed to pass through. Reverse osmosis removes particles larger than 0.1 nm.

In one embodiment, the disclosed system further includes a second direct contact membrane distillation unit 28 in fluid communication with the reverse osmosis membrane 16.

In one embodiment, the disclosed system further includes a vacuum pump 18 connected to a head space in the electrocoagulation unit 2 (or EF unit 2A) and to the filtration unit 12.

In one embodiment, a once through steam generator (OTSG) or a boiler 20 is connected to the output of the reverse osmosis membrane 16 for generating steam from the desalinated water produced by the disclosed system. In one embodiment, an injection pump 22 is connected to the boiler 20 capable of injecting steam from the boiler 20 into a hydrocarbon producing formation (not shown) to enhance hydrocarbon recovery from the formation.

A process for treating high temperature produced water derived from hydrocarbon production operations for producing regenerant brine will now be described. Again referring to FIG. 1, in one embodiment, a produced water feed stream 1 derived from hydrocarbon production operations is passed to the electrocoagulation unit 2 (or EF unit 2A), as described previously. The produced water feed stream 1 (also referred to as the feed stream) can have a feed temperature from 70° C. to 95° C., even from 75° C. to 95° C. The feed stream 1 can have a total dissolved solids (TDS) concentration less than 15,000 mg/L, even from 5,000 to 15,000 mg/L, and a hydrogen sulfide content of up to 1000 ppm. The feed stream can have a dispersed oil content of from 100 mg/L to 300 mg/L. The feed stream can have a level of hardness of from 100 mg/L to 5000 mg/L as calcium carbonate. The feed stream can have a pH level of from 6.0 to 8.0 (near neutral). In one embodiment, the feed stream is produced water coming which is fed from a wash tank or separator 26. In some embodiments, the feed stream 1 can have a TDS level of nearly 200,000 mg/L and a hardness of nearly 20,000 mg/L. Such produced water streams can be generated from shale formations in which the produced water derives its high temperature from heat generated during pumping at high pressure. The feed stream 1 may contain both inorganic and organic constituents that limit the discharge options, e.g., dispersed oil, dissolved or soluble organics, produced solids, scales (e.g., precipitated solids, gypsum ($CaSO_4$), barite ($BaSO_4$)), bacteria, metals, low pH, sulfates, naturally occurring radioactive materials (NORM), and chemicals added during extraction. The feed stream 1 may contain at least 1,000 mg/L TDS, even at least 5,000 mg/L TDS, and even at least 10,000 mg/L TDS. In some locations, the feed stream 1 may have TDS concentrations of at least 150,000 mg/L. In terms of hardness level (as Mg, Ca, Sr, Ba), the concentration may range from 200-2000 mg/L Mg; from 5000 to 40,000 mg/L Ca, from 1000-10,000 mg/L Sr, and from 1000-10,000 mg/L Ba. The oil related compounds in the feed stream 1 can contain benzene, xylene, ethyl benzene, toluene, and other compounds that may be found in crude oil and natural gas sources. The amount of TOC as free oil and grease can be substantially higher when there is a process upset. Typically, the feed stream 1 will also contain metals, e.g., arsenic, barium, iron, sodium and other multivalent ions, which appear in many geological formations.

If there is some acidic gas in the produced water such as $H_2S$, the electrocoagulation unit 2 can release ferrous ions in the water such that $H_2S$ can be captured from the stream.

The feed stream 1 is then passed either to a clarifying unit 24, such as an induced gas flotation unit or a dissolved air flotation unit, or to the first direct contact membrane distillation unit 4 (as described previously) where the produced water feed stream 1 contacts the hydrophobic membrane 6 on the membrane feed side 6A. An inlet product side stream 17 including deionized water contacts the hydrophobic membrane 6 on a membrane product side 6B at a temperature of from 15° C. to 35° C. A first distilled water stream is recovered from the produced water feed stream 1 and collected with the inlet product side stream 17 on the membrane product side 6B to form an exit product side stream (also referred to as the product stream) 13. A volume-depleted exit produced water stream (also referred to as the reject stream) 15 is formed on the membrane feed side 6A of the hydrophobic membrane 6. The exit product side stream 13 is passed through the heat recovery heat exchanger 8 where the exit product side stream 13 transfers heat to the volume-depleted exit produced water stream 15 to form a return inlet produced water stream 19. The return inlet produced water stream 19 is returned from the heat recovery heat exchanger 8 to a location in a line 5 upstream of the first direct contact membrane distillation unit 4 for an additional pass through the first direct contact membrane distillation unit 4, thereby recovering additional water from the membrane feed side 6A to the membrane product side 6B. The return inlet produced water stream can be returned multiple times as needed to achieve a recovery of from 15 to 45 vol %, even from 5 to 25 vol % depending on the requirement, of the produced water feed stream 1. In one embodiment, the recovery achieved is from 15 to 30 vol % of the produced water feed stream. Eventually, a final exit produced water stream leaving the first direct contact membrane distillation unit 4 is formed having a temperature of from 40 to 60° C., a total oil and grease content no greater than 500 mg/L, and a suspended solids content no greater than 200 mg/L.

A first portion 21 of the first distilled water stream from the first direct contact membrane distillation unit 4 is passed to a brine tank 9 at a temperature of from 55 to 80° C. where the first portion of the first distilled water stream is combined with sodium chloride to form a concentrated (e.g., near saturation) brine solution which may contain from 8 wt % to 18 wt % brine. The concentrated brine solution can be stored in brine tank 9. Finally, the concentrated brine solution can be utilized to regenerate used ion exchange resin in the water softening system 11 wherein monovalent sodium ions in the brine solution displace multivalent ions on the ion exchange resin.

The reject stream 15 from the low recovery MD unit 4 is slightly concentrated produced water (e.g., increased by a factor of 30% or contains 30% more TDS, grease, solids, and the like). The reject stream 15 from the low recovery MD unit 4 will be at a lower temperature. The temperature can be tuned to a desired temperature by either increasing the number of passes through the MD unit 4 to increase recovery. Alternatively, the reject brine can be mixed with additional produced water feed from the wash tank 26, which is therefore hotter and higher in oil and grease content. The temperature of the reject stream 15 can be matched with the temperature tolerance of the filtration membrane(s) which it will contact.

In one embodiment, as shown in FIG. 2, the reject stream 15 at a temperature up to 65° C. is passed to a high temperature polymeric membrane 12 that works very efficiently at temperatures up to 65° C., to form a clarified stream substantially free of suspended solids, oil and grease. The filtration unit 12 can use an ultrafiltration membrane, which is a polymeric membrane or a ceramic membrane. In one embodiment, the reject stream 15 at a temperature greater than 65° C. is passed to a high temperature ceramic ultrafiltration (UF) membrane 12 that can be used with no temperature limitations. In one embodiment, the reject stream 15 is at a temperature less than 50° C. and is passed to an ambient temperature ultrafiltration (UF) membrane 12.

In one embodiment, it can be passed through high temperature polymeric UF membranes which are able to withstand temperatures up to 65-70° C. There is no restriction on temperatures with the ceramic membranes. The $H_2S$ removal can be enhanced and the formation of calcite prevented by optionally running the water through the UF membrane 12 at slightly acidic pH (i.e., 4-6).

Following filtration 12, the stream is passed to an ion exchange unit 14 (described previously). Within the ion exchange unit 14, the clarified stream can contact a strong acid cation resin to form a soft water stream, e.g., having a hardness of less than 10 ppm as calcium carbonate. In one embodiment, the concentrated brine solution from the brine tank 9 can be used to regenerate the strong acid cation resin in the ion exchange unit 14. In one embodiment, the strong acid cation resin is a shallow shell ion exchange resin having a surface functional group. In another embodiment, the ion exchange unit 14 includes a functionalized microfiltration membrane having pores therein having surface functional groups capable of exchanging ions. In one embodiment, concentrated brine solution from brine tank 9 is fed to the ion exchange unit 14 to regenerate the resin and/or functional groups in the ion exchange unit 14.

Following the ion exchange unit 14, the soft water stream can be passed to a reverse osmosis (RO) unit 16 (as described previously). The reverse osmosis process can optionally occur at high temperature. For instance, in one such embodiment, the final exit produced water stream leaving the membrane distillation unit 4 can have a temperature of from 50 to 60° C.; the filtration unit can be a high temperature polymeric ultrafiltration membrane or a ceramic membrane; and the soft water stream that passes through the reverse osmosis membrane can be at a temperature of from 55 to 65° C. Reject and product streams are formed upon passing the soft water stream through the reverse osmosis membrane unit 16.

In embodiments in which RO is used, some optional steps are preferred. In one embodiment, the pH of the feed water is raised to around 9 to assist in removing hardness in the EC unit 2. When silica is present in the feed water 1, it is removed in the EC unit 2. Alternatively, the EC unit 2 can be operated at low energy usage, and magnesium oxide or magnesium chloride may be added to capture the silica. The EC unit 2 can be replaced by a warm lime softener chemical precipitation unit using compounds such as lime and magnesium oxide at a pH of 9-10 for silica capture. In one embodiment, a softener system may be used to soften the water. If the TDS is less than 5000 mg/L, a SAC-SAC system may be preferred. If the TDS is between 5000 and 15000, a SAC-WAC or a WAC-WAC softener may be preferred. Between the softeners and the RO membrane, an absorbent can be used to capture dissolved organic carbon. Suitable absorbents include materials such as Osorb Media available from Prosep Inc. (Houston, Tex.) or Dowex Optipore available from The Dow Chemical Company (Midland, Mich.). These materials can be regenerated using steam.

The RO unit 16 is capable of recovering additional water, up to 70-80%, until the reject brine has a TDS of >60,000 mg/L.

In embodiments when the treated water is used for irrigation, a boron selective resin can be used with the RO permeate. When the water is to be used in once through the recovery steam generators (OTSGs) and boilers, no further polishing is needed.

One embodiment involves passing the reject stream 23 from the reverse osmosis membrane unit 16 to a second direct contact membrane distillation unit, also referred to as a high recovery MD unit 28. The recovery of the MD process can be from 60% to 90%. The product stream from the MD unit 28 is a stream of desalinated water 30. The desalinated water is high-quality water that can be boiled to form steam. In one embodiment, the steam can be injected into a hydrocarbon producing formation in a process to enhance hydrocarbon recovery from the hydrocarbon producing formation (not shown).

A reject stream of water 25 is provided from the MD unit 28 having a TDS concentration of less than 250,000 mg/L. In one embodiment, the reject stream 25 can potentially be used in a SAC regeneration step as a regenerant brine solution, depending on the hardness level of the reject stream. The reject stream 25 can be passed through a chemical precipitation process such as warm lime softening to remove hardness.

A supplemental heat exchanger 29 can be employed to utilize extra waste heat from the field, e.g., from flue gas combustion chambers (not shown) or heat associated with motor driven devices (not shown) such as high pressure pumps.

It should be noted that only the components relevant to the disclosure are shown in the figures, and that many other components normally part of a produced water treatment system are not shown for simplicity.

For the purposes of this specification and appended claims, unless otherwise indicated, all numbers expressing quantities, percentages or proportions, and other numerical values used in the specification and claims are to be understood as being modified in all instances by the term "about." Accordingly, unless indicated to the contrary, the numerical parameters set forth in the following specification and attached claims are approximations that can vary depending upon the desired properties sought to be obtained by the present invention. It is noted that, as used in this specification and the appended claims, the singular forms "a," "an," and "the," include plural references unless expressly and unequivocally limited to one referent.

Unless otherwise specified, the recitation of a genus of elements, materials or other components, from which an individual component or mixture of components can be selected, is intended to include all possible sub-generic combinations of the listed components and mixtures thereof. Also, "comprise," "include" and its variants, are intended to be non-limiting, such that recitation of items in a list is not to the exclusion of other like items that may also be useful in the materials, compositions, methods and systems of this invention.

This written description uses examples to disclose the invention, including the best mode, and also to enable any person skilled in the art to make and use the invention. The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. All citations referred herein are expressly incorporated herein by reference.

From the above description, those skilled in the art will perceive improvements, changes and modifications, which are intended to be covered by the appended claims.

What is claimed is:

1. A process for treating high temperature produced water derived from hydrocarbon production operations, the process comprising:

a. passing a produced water feed stream at a feed temperature from 70° C. to 95° C. and having a total dissolved solids concentration less than 15,000 mg/L and a hydrogen sulfide content of up to 1000 ppm to an electrocoagulation unit or an electroflotation unit;

b. passing the produced water feed stream from the electrocoagulation unit or the electroflotation unit to a first direct contact membrane distillation unit wherein:
 i. the produced water feed stream contacts a hydrophobic membrane on a membrane feed side; and
 ii. an inlet product side stream comprising deionized water contacts the hydrophobic membrane on a membrane product side at a temperature of from 15° C. to 35° C.; such that a first distilled water stream is recovered from the produced water feed stream and collected with the inlet product side stream on the membrane product side to form an exit product side stream; and a volume-depleted exit produced water stream is formed on the membrane feed side of the hydrophobic membrane;

c. passing the exit product side stream in a pass through a heat recovery heat exchanger wherein the exit product side stream transfers heat to the volume-depleted exit produced water stream to form a return inlet produced water stream;

d. returning the return inlet produced water stream from the heat recovery heat exchanger to a location upstream of the first direct contact membrane distillation unit for an additional pass through the first direct contact membrane distillation unit, thereby recovering additional water from the membrane feed side to the membrane product side;

e. repeating steps (c) and (d) as needed to achieve a recovery of from 15 to 45 vol % of the produced water feed stream and to form a final exit produced water stream leaving the first direct contact membrane distillation unit having a temperature of from 40 to 60° C., a total oil and grease content no greater than 500 mg/L, and a suspended solids content no greater than 200 mg/L;

f passing a first portion of the first distilled water stream from the first direct contact membrane distillation unit to a brine tank at a temperature of from 55 to 80° C. wherein the first portion of the first distilled water stream is combined with sodium chloride to form a concentrated brine solution comprising from 8 wt % to 18 wt % brine; and g. utilizing the concentrated brine solution to regenerate used ion exchange resin in a water softening system wherein monovalent sodium ions in the brine solution displace multivalent ions on the ion exchange resin.

2. The process of claim 1, wherein the recovery in step (e) is from 15 to 30 vol % of the produced water feed stream.

3. The process of claim 1, further comprising:

h. passing the final exit produced water stream from the first direct contact membrane distillation unit to a filtration unit comprising an ultrafiltration membrane, a polymeric membrane or a ceramic membrane to form a clarified stream substantially free of suspended solids, oil and grease;

i. passing the clarified stream from the filtration unit to an ion exchange unit thereby forming a soft water stream having a hardness of less than 10 ppm as calcium carbonate; and j. passing the soft water stream through a reverse osmosis membrane to form a product stream and a reject stream.

4. The process of claim 3, wherein the final exit produced water stream leaving the first direct contact membrane distillation unit has a temperature of from 50 to 60° C.; the filtration unit comprises a high temperature polymeric ultrafiltration membrane or a ceramic membrane; and the soft water stream passes through the reverse osmosis membrane at a temperature of from 55 to 65° C.

5. The process of claim 3, further comprising passing the reject stream to a second direct contact membrane distillation unit such that a stream of desalinated water is provided having a second direct contact membrane distillation unit recovery of from 60% to 90% and a reject stream of water is provided having a total dissolved solids concentration of less than 250,000 mg/L.

6. The process of claim 1, wherein the electrocoagulation unit includes a head space under vacuum of from 5 to 50 psi to remove at least a portion of the hydrogen sulfide.

7. The process of claim 3, wherein the electrocoagulation unit or the electroflotation unit includes a head space and wherein the head space and the filtration unit are under vacuum of from 5 to 50 psi to remove gases thereby resulting in an oxygen-free water product stream.

8. The process of claim 3, wherein the ultrafiltration membrane has a feed side and a permeate side and wherein the permeate side is under vacuum of from 5 to 50 psi to remove gases thereby resulting in an oxygen-free water product stream.

9. The process of claim 5, further comprising boiling the stream of desalinated water to form steam.

10. The process of claim 9, further comprising injecting the steam into a hydrocarbon producing formation in a process to enhance hydrocarbon recovery from the hydrocarbon producing formation.

11. The process of claim 3, wherein the ion exchange unit contains a strong acid cation resin and wherein the concentrated brine solution from the brine tank is used to regenerate the strong acid cation resin in the ion exchange unit.

12. The process of claim 3, wherein the ion exchange unit contains a strong acid shallow shell ion exchange resin having a surface functional group.

13. The process of claim 3, wherein the ion exchange unit contains a functionalized microfiltration membrane comprising ion exchanging functional groups.

14. The process of claim 1, further comprising passing the produced water feed stream from the electrocoagulation unit or the electroflotation unit to a clarifying unit selected from an induced gas flotation unit or a dissolved air flotation unit.

* * * * *